March 17, 1959  E. L. YUNCKER  2,878,053
REMOVABLE MATERIAL GUIDE FOR TRUCKS AND THE LIKE
Filed Oct. 25, 1955
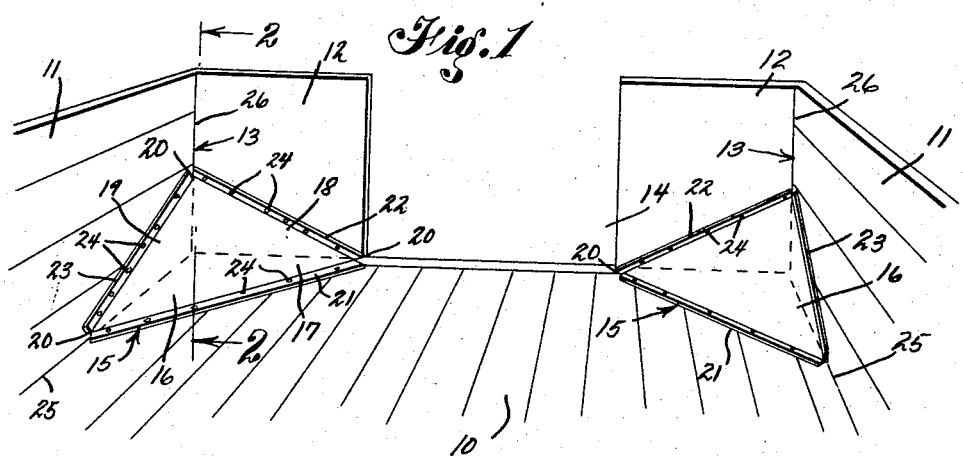
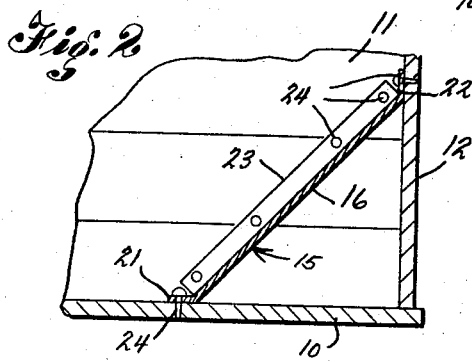
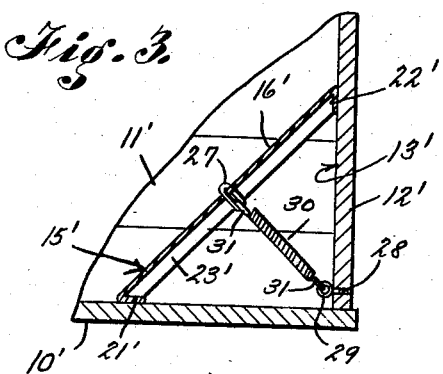
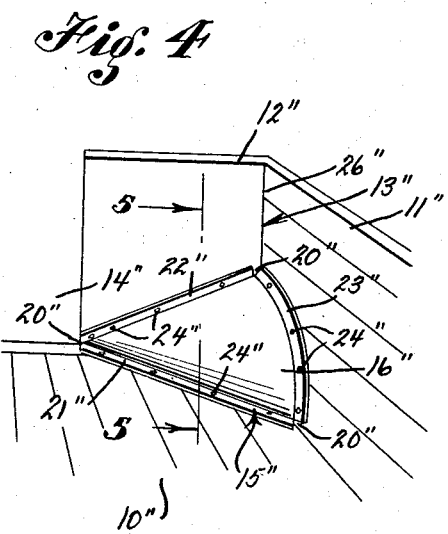
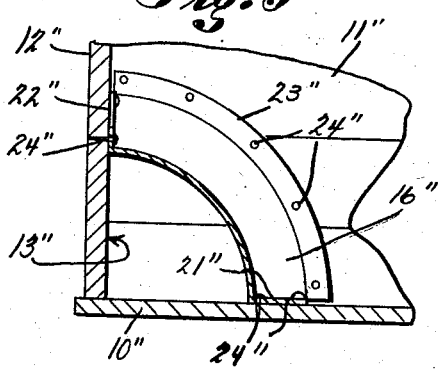
INVENTOR
Ervin L. Yuncker
BY John A. Mawhinney
ATTORNEY

United States Patent Office 2,878,053
Patented Mar. 17, 1959

2,878,053

REMOVABLE MATERIAL GUIDE FOR TRUCKS AND THE LIKE

Ervin L. Yuncker, Belpre, Kans.

Application October 25, 1955, Serial No. 542,562

2 Claims. (Cl. 296—15)

The present invention relates to a removable material guide for trucks and the like and has for an object the provision of a device of this kind which can be inserted in the corners of the material containing bodies of material hauling vehicles to prevent the lodging and accumulation of material in the corners so that after the material is discharged from the vehicle it will not be necessary to sweep out the corners as is the usual present custom.

Another object of the present invention is to provide a device of this character which is more particularly designed for use in the truck bed of conventional hydraulic lift discharging vehicles and can be quickly and easily applied to and removed from the rear corners of the truck bed so as not to interfere with the use of the vehicle for hauling other products or for other purposes.

A further object of the present invention is to provide a grain guide which has no moving parts to wear out or to require adjustment or skill to install and which can be secured removably in place by conventional screws, bolts or a spring.

The present invention aims to provide a device of this kind which can be applied to grain vehicles already in service or new ones being constructed without requiring any changes in the structure of the vehicle.

The present invention also aims to provide a grain guide which will cooperate with the discharge opening in the rear wall of the vehicle to direct the grain which heretofore has lodged in the rear corners of the vehicle truck bed towards the discharge opening.

With the foregoing and other objects in view, the invention will be hereinafter more fully described and more particularly pointed out in the appended claims.

In the drawings in which the same parts are denoted by the same reference numerals throughout the several views, Figure 1 is a fragmentary perspective view of the rear end portion of the truck bed of a conventional grain hauling vehicle with grain guides constructed in accordance with the present invention applied to the rear corners thereof, Figure 2 is a sectional view taken on the line 2—2 of Figure 1, Figure 3 is a similar view showing a modified form of grain guide, Figure 4 is a fragmentary perspective view of the rear end of a grain truck with another modified form of grain guide applied thereto, and Figure 5 is a sectional view taken on the line 5—5 of Figure 4.

Referring more particularly to the drawings, 10 indicates the bed or floor of the truck body of a grain hauling vehicle which may be of the conventional hydraulic lift dumping or discharge type. At 11 are indicated the side walls which extend upwardly from the opposite sides of the bed 10 at substantially right angles thereto. A pair of rear end walls 12 extend upwardly from the opposite side portions of the rear end of the bed 10 at substantially right angles thereto. The outer side edge portions of the walls 12 abut the rear edges of the adjacent side wall 11 and form a substantially right angled corner 13 therewith. The inner side edges of the walls 12 terminate short of one another to provide a space or opening 14 therebetween for the discharge of the grain from the bed 10 of the truck.

It is an object of this invention to prevent the lodging and accumulation of grain in the rear corners 13 of the truck bed. For this purpose, a grain guide generally indicated at 15 is positioned in each corner 13. The guide 15 may be made of metal or other appropriate material and comprises a flat body portion 16 of triangular shape having a base 17 and sides 18 and 19. The body portion 16 is cut at its apices as indicated at 20 to permit the marginal edge portions of the base and sides to be bent upwardly to form an attaching base flange 21 and attaching side flanges 22 and 23. The flanges are disposed at an angle of the order of forty-five degrees to the plane of the body portion 16 and each flange has formed therein a row of spaced apart holes for receiving therethrough fastening elements 24 such as screws or stove bolts.

In the use of the device, one of the grain guides 15 will be positioned in each rear corner 13 at a suitable inclination for causing the grain as it is being discharged from the bed 10 to roll down the upper flat face of the body portion which is smooth so as to facilitate this rolling action. As is shown in Figure 2 of the drawing, this inclination may be at an angle of the order of forty-five degrees and this inclination can be varied by a substantially corresponding change in the angle of the base flange 21 to the plane of the body portion 16. The guide 15 will be positioned diagonally across the corner 13 with the base flange 21 engaging the bed 10, the flange 22 engaging the rear wall 12 and the flange 23 engaging the side wall 11. The fastening elements 24 will now be inserted in the holes in the flanges and will be forced into the bed and rear and side walls as can be seen in Figure 2 of the drawing to secure the guides 15 in place.

It will be noted that in positioning the guide 15 in its corner, the lower left hand apex or cut away portion, looking at Figure 1, will be placed in the line of juncture 25 between the bed 10 and the side 11 and the upper apex or cut away portion will be placed in the line of juncture 26 between the walls 11 and 12. This will orient the guide and in cooperation with the base flange 21 will bring the lower right hand apex or cut away portion adjacent the discharge opening 14.

With the guides 15 thus positioned when the vehicle body is tilted to its discharge position, the body portion 16 of each guide will be inclined downwardly and rearwardly towards the lower part of the discharge opening 14 so that the grain which would in the conventional truck bed lodge in the corners, 13, will roll down the inclined body portions 16 of the guides to and out through the discharge opening. The fastening elements 24 can be quickly and easily withdrawn and the guides 15 removed to permit the use of the vehicle for hauling other commodities than grain or the like.

In Figure 3 is illustrated a different means for removably holding the grain guide in place. In this Figure 3, the parts corresponding to those of Figures 1 and 2 have the same reference characters applied thereto with prime added. The flanges 21', 22' and 23' are bent in the opposite direction to the flanges 21, 22 and 23 and may be imperforate as the fastening elements 24 are not used in this form of the invention.

The body portion 16' of each grain guide 15' has formed therethrough at substantially the center thereof two spaced apart apertures for receiving therethrough and supporting a wire loop 27. A fastening element 28, such an eye bolt or screw having an eye 29 is inserted into the rear wall 12' in the lower portion of the corner 13'. A resilient element 30, which may be a coil spring, has a hook 31 on each end for engaging in the loop 27 and eye 29. The guide 15' can be positioned in the corner by engaging one of the hooks 31 of the spring 30 in the eye 29 then holding the guide in the corner 13' at an angle and stretching the spring 30 until the other hook 31 can be engaged in the loop 27. The guide 15' will then be orientated into its desired position in the same manner as the guide 15. The spring 30 will be of sufficient strength to hold the guide in proper position and yet permit the easy removal of the guide when desired. The guides 15' will function in the same manner as the guides 15.

In Figures 4 and 5 is illustrated a further modification of the invention and in these figures the parts corresponding to those of Figures 1 and 2 have the same reference characters applied thereto with double primed added. In this form of the invention, the grain guides 15" are not flat as in the forms shown in Figures 1 through 3, but have the shape substantially of a segment of a cone. The upper outer face of the body portion 16" is convex as can be clearly seen in Figure 5. The guides 15" will be positioned in the corners 13" with the flanges 23", which form the bases of the conical segments, engaging the side walls 11" and the apices of the conical segments adjacent the lower part of the discharge opening 14". The guides 15" will be orientated and located in the corners 13" in the same manner as the guides 15.

During the discharging operation, the grain falling upon the upper half part of the body portion 16" will gravitate downwardly and inwardly over the convex conical shaped upper surface of the body portion towards the apex of the conical segment. The portion of the grain contacting the lower half part of the body portion 16" will slide downwardly toward the bed 10" and due to the inclination of the truck bed will be guided by the lower half part of the body portion towards the apex of the guide 15" and out through the discharge opening 14".

The truck bed may also be tilted by a hoist in a conventional grain elevator. The discharge opening is normally closed in the conventional manner and opened when it is desired to discharge the grain.

It is obvious that various changes and modifications may be made in the details of construction and design of the above specifically described embodiment of this invention, without departing from the spirit thereof, such changes and modifications being restricted only by the scope of the following claims:

What I claim is:

1. For use with a material hauling truck having a bed, side walls extending up from opposite sides of the bed and spaced apart rear end walls extending upwardly from the rear end of the bed to provide a discharge opening therebetween and each rear end wall contacting the adjacent side wall forming a corner therewith, removable material guide means comprising a guide member adapted to be inserted into each corner, each guide member being of the shape of a segment of a cone and adapted to be inserted into its corner with its convex surface outermost, its apex disposed at one edge of the discharge opening and its base engaging the adjacent side wall of the truck at a higher elevation than the apex of the guide member so that the convex surface of the guide member slopes generally from its base towards its apex to guide the material towards the discharge opening when the truck is in its discharging position, the lower portion of the convex surface of the guide member adapted to be disposed a substantial distance below the upper edge of the adjacent truck side wall and at substantially right angles to the upper surface of the truck bed for presenting to the material a substantially flat vertical wall inclined rearwardly and inwardly towards the discharge opening and the upper portion of the convex surface of the guide member adapted to be disposed a substantial distance below the upper edge of the adjacent rear end wall of the truck and at substantially right angles to the truck rear end wall for presenting to the material a substantially flat surface inclined downwardly and inwardly toward the discharge opening.

2. Removable material guide means as claimed in claim 1 further comprising means for holding each guide member in its corner.

References Cited in the file of this patent

UNITED STATES PATENTS

| 396,126 | White | Jan. 15, 1889 |
| 1,428,196 | Weaver | Sept. 5, 1922 |
| 1,774,125 | Barrows | Aug. 26, 1930 |
| 1,845,603 | Huntley | Feb. 16, 1932 |
| 2,152,617 | Thompson | Mar. 28, 1939 |
| 2,344,569 | Snyder | Mar. 21, 1944 |
| 2,555,288 | Kruger | May 29, 1951 |
| 2,648,428 | White | Aug. 11, 1953 |

FOREIGN PATENTS

| 641,373 | France | Apr. 16, 1928 |
| 776,185 | France | Oct. 31, 1934 |
| 1,030,510 | France | Mar. 11, 1953 |
| 521,903 | Great Britain | June 4, 1940 |